(12) United States Patent
Quach

(10) Patent No.: US 6,636,991 B1
(45) Date of Patent: Oct. 21, 2003

(54) FLEXIBLE METHOD FOR SATISFYING COMPLEX SYSTEM ERROR HANDLING REQUIREMENTS VIA ERROR PROMOTION/ DEMOTION

(75) Inventor: Nhon Quach, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/470,970

(22) Filed: Dec. 23, 1999

(51) Int. Cl.$^7$ ................................................ G06F 11/00
(52) U.S. Cl. ............................ 714/52; 714/774; 714/10
(58) Field of Search ............................ 714/52, 51, 23, 714/1, 10, 11, 12, 774, 706, 708; 701/33

(56) References Cited

U.S. PATENT DOCUMENTS

| | | | | |
|---|---|---|---|---|
| 4,635,214 A | * | 1/1987 | Kasai et al. ................ 702/183 |
| 5,274,674 A | * | 12/1993 | Lafon ......................... 375/317 |
| 5,315,972 A | * | 5/1994 | Judy et al. ............... 123/198 D |
| 5,500,940 A | * | 3/1996 | Skeie .......................... 714/25 |
| 5,621,737 A | * | 4/1997 | Bucher ....................... 714/704 |
| 5,699,365 A | * | 12/1997 | Klayman et al. ........... 714/708 |
| 5,740,357 A | * | 4/1998 | Gardiner et al. ............ 709/223 |
| 5,764,651 A | * | 6/1998 | Bullock et al. ............. 714/708 |
| 6,314,535 B1 | * | 11/2001 | Morris et al. ............... 714/708 |
| 6,334,193 B1 | * | 12/2001 | Buzsaki ......................... 714/2 |
| 6,345,366 B1 | * | 2/2002 | Asano et al. .................. 714/2 |
| 6,418,542 B1 | * | 7/2002 | Yeager ......................... 707/1 |
| 6,421,740 B1 | * | 7/2002 | LeCroy ....................... 709/315 |

* cited by examiner

Primary Examiner—Robert Beausoliel
Assistant Examiner—Marc Duncan
(74) Attorney, Agent, or Firm—Paul E. Steiner

(57) ABSTRACT

A signaling mechanism associated with errors in a processor is promoted or demoted based on a set of stored values.

19 Claims, 3 Drawing Sheets

FLEXIBLE METHOD FOR SATISFYING COMPLEX SYSTEM ERROR HANDLING REQUIREMENTS VIA ERROR PROMOTION/DEMOTION

FIELD OF THE INVENTION

The present invention relates generally to a multi-processor system, such as a multi-processor computer system. More particularly, the present invention relates to a processor including error handling logic which controls the way the processor handles various types of system errors.

BACKGROUND OF THE INVENTION

Memory and logic elements in a microprocessor or processor are sensitive to soft errors which can be induced by background cosmic radiation and alpha particle bombardment. A soft error is an unexpected or unwanted change in the computer system. For example, one bit in a storage element may suddenly, randomly change state from a "0" to a "1" or vice versa. Another example of a soft error is a glitch of noise inside the computer system which may get stored as if the noise were valid data. In either of these two cases, one bit becomes something other than what it is supposed to be, possibly changing an instruction in a program or data value.

Processors frequently employ parity-based mechanisms to detect data corruption due to soft errors. A parity bit is associated with each block of data when data is stored. The parity bit is set to either one or zero according to whether there is an odd or an even number of ones in the data block. When the data is read out of its storage location, the number of ones in the block is compared with the parity bit. A discrepancy between the values indicates that the data block has been corrupted. An agreement between the values indicates that either no corruption has occurred or two or more bits have been altered. Since that later event has a low probability of occurring, the parity-based mechanism provides a reliable indication as to whether data has been corrupted. An error handling mechanism is employed to either correct the detected error or minimize its impact. Soft errors may be corrected via hardware, software, or both.

A commonly used hardware error correction scheme is error correction codes (ECCs) which is a parity-based mechanism that tracks additional information for each data block. The additional information allows the corrupted bit(s) to be identified and corrected. The entire error correction process is transparent to the software that is running at the time the error occurs. While effective, a pure hardware ECC based error correction scheme is complex and inefficient to implement based on the amount of silicon area that it consumes.

Because of this, current processors utilize a prioritization scheme, a the first type of error is only detected and corrected in the processor hardware. A second type is detected in the processor and corrected in firmware. A third type of error can be detected, but not corrected, even with firmware. Finally, a fourth type of error detected by the processor, requires the processor to be rebooted. Each type of error is signaled to the processor differently to allow the processor to behave differently. This is referred as the signaling mechanism.

This prioritization scheme is not necessarily advantageous to the other features in the computer system's operating system as well as its platform (the hardware and firmware portion of the computer system other than the processors). For example, in platforms which are used in mission critical computing, the signaling mechanism for a detected error type 4 given treatment would be catastrophic. This is because these platforms desire some level of system availability and error information collection and not computer system reboot.

On the other hand, in non-mission critical computing for the low-end of the computer market (i.e., personal computers), it is acceptable for a user's computer system automatically reboots when the computer system encounters soft errors. However, each of these approaches remains independent of each other, while only addressing a subset of the problems associated with the different prioritization schemes for a computer system's processor, operating system and platform.

Accordingly, what is needed is an effective and efficient error handling mechanism that controls the processor to promote or demote the error type in a manner that is compatible with the computer system's operating system and platform.

SUMMARY OF THE INVENTION

In accordance with an embodiment of the present invention, signaling mechanisms associated with errors in a processor are promoted or demoted based on a set of stored values.

DETAILED DESCRIPTION

The present invention relates to processor error handling logic that controls the way a processor generates a signaling mechanism for specific error types. According to an embodiment of the present invention, the processor error handling logic can be programmed such that it promotes or demotes the signaling mechanism of specific error types. The following description is presented to enable one of ordinary skill in the art to make and use the invention. Various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
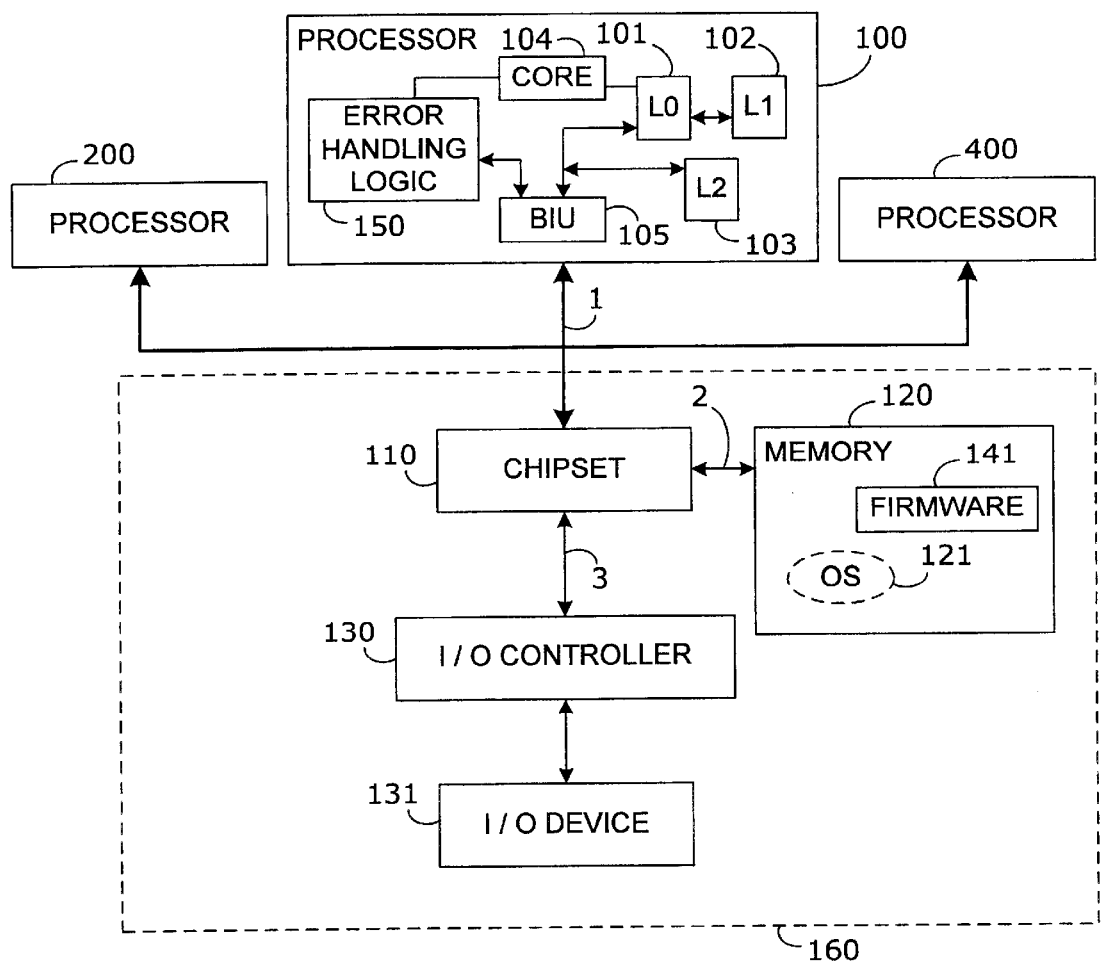
FIG. 1 is a block diagram illustrating a computer system in accordance with an embodiment of the present invention.

FIG. 1 illustrates a basic block diagram of a general purpose computer system for use with the present invention. As shown, the computer system includes processors 100, 200 and 400 coupled to a chipset 110 via system bus 1. Chipset 110 is further coupled to a memory 120, for example a random access memory (RAM) and read only memory (ROM) via memory bus 2, an input/output (I/O) controller 130 via I/O bus 3. For purposes of this discussion, the term "platform" suitably refers to the combination of the chipset 110, memory 120, I/O controller 130 which has been labeled 160.

An operating system (O/S) 121 stored in memory 120 typically runs on the platform to perform basic tasks in the computer system which operates in conjunction with application programs. Also running on the platform is firmware 141 located in memory 120. Firmware 141 is code stored in suitable memory such as non-volatile RAM or erasable programmable read only memory (EPROM), as well understood to those skilled in the art.

I/O controller 130 is coupled to chipset 110 for controlling the interactions between the processor 100 and chipset 110 and subordinate components, i.e., sub-components, such as input/output devices 131, e.g., a hard disk drive, a monitor, etc. that adhere to an input/output standard, such as a peripheral component interconnect (PCI) standard.

Processor 100 may include caches 101–103 such as L0, L1 and L2 caches and a processor core 104. Processor 100 further includes processor error handling logic 150. Processor 100 further includes a bus interface unit (BUI) 105 which receives data and code instructions from the chip set 110 and firmware processor 141 and memory 120. The BUI sends data and code along several paths going to the caches 101–103 and the processor error handling logic. The processor error handling logic communicates with the caches via processor core 104. The processor error handling logic receives coded data that an error has been detected in the computer system. Errors that occur in the memory and the caches or other storage devices are sent to the processor error logic.

Soft error types may be classified as one of the following four error types discussed above:

Error Type 1—errors that are detected and corrected by processor error handling logic within the processor. An example of an error type 1 may include a cache ECC tag or data error.

Error Type 2—errors that are detected by the processor error handling logic but are corrected by the computer system's firmware (code used in conjunction with hardware and software stored in nonvolatile memory) An example of an error type 2 may include an instruction cache tag or data error.

Error Type 3—errors that are detected by the processor error handling logic but cannot be corrected by computer system's firmware. An example of an error type 3 may include the processor reading a modified line from a cache and encountering a parity error.

Error Type 4—errors that are detected by the processor error handling logic and the computer system has to be rebooted. An example of an error type 4 may include a tag error in a modified line in the cache and other processors are about to read the line out of the cache via a snoop operation. When a processor fails to find a line in its internal cache(s), the address of the read is put on the system bus 1 to access the data in the main memory. It is possible for the other processors to contain the most up to date data. Therefore, in response to this action, other processors "snoop" their caches by looking up the data in their caches. If the line is found modified in the caches, the data will have to be returned from that cache to the requesting processor.

As implemented in current systems, associated with each soft error type is a signaling mechanism that allows the processor error handling logic to treat the various soft error types with different levels of urgency, i.e., a prioritization scheme. In one embodiment of the present invention, the signaling mechanism for the error types discussed above include:

Signaling Mechanism for Error Type 1—The processor error handling logic corrects the error and sends a Corrected Machine Check Interrupt (CMCI) to the operating system for error statistic error logging.

Signaling Mechanism for Error Type 2—The processor error handling logic takes a local Machine Check Abort (MCA) and transfers control of the error to the firmware. The firmware corrects the error and then sends a CMCI to the operating system.

Signaling Mechanism for Error Type 3—The processor error handling logic takes a global MCA and via its bus error (BERR) pin (which causes all processors sharing the same system bus to take a MCA) and transfers control of the error to the firmware. The firmware corrects error information and sends the information to the operating system for error statistic error logging. This signaling does not reboot the computer system immediately but allows for as much-error information as possible to be collected before rebooting.

Signaling Mechanism for Error Type 4—The processor error handling logic takes a global MCA via its bus initialization (BINIT) pin. All processors perform a reset of their internal states and transfer control of the error to the firmware. The firmware collects error information and sends it to the operating system for error statistic logging. The computer system is then typically reset.

Figure 2:
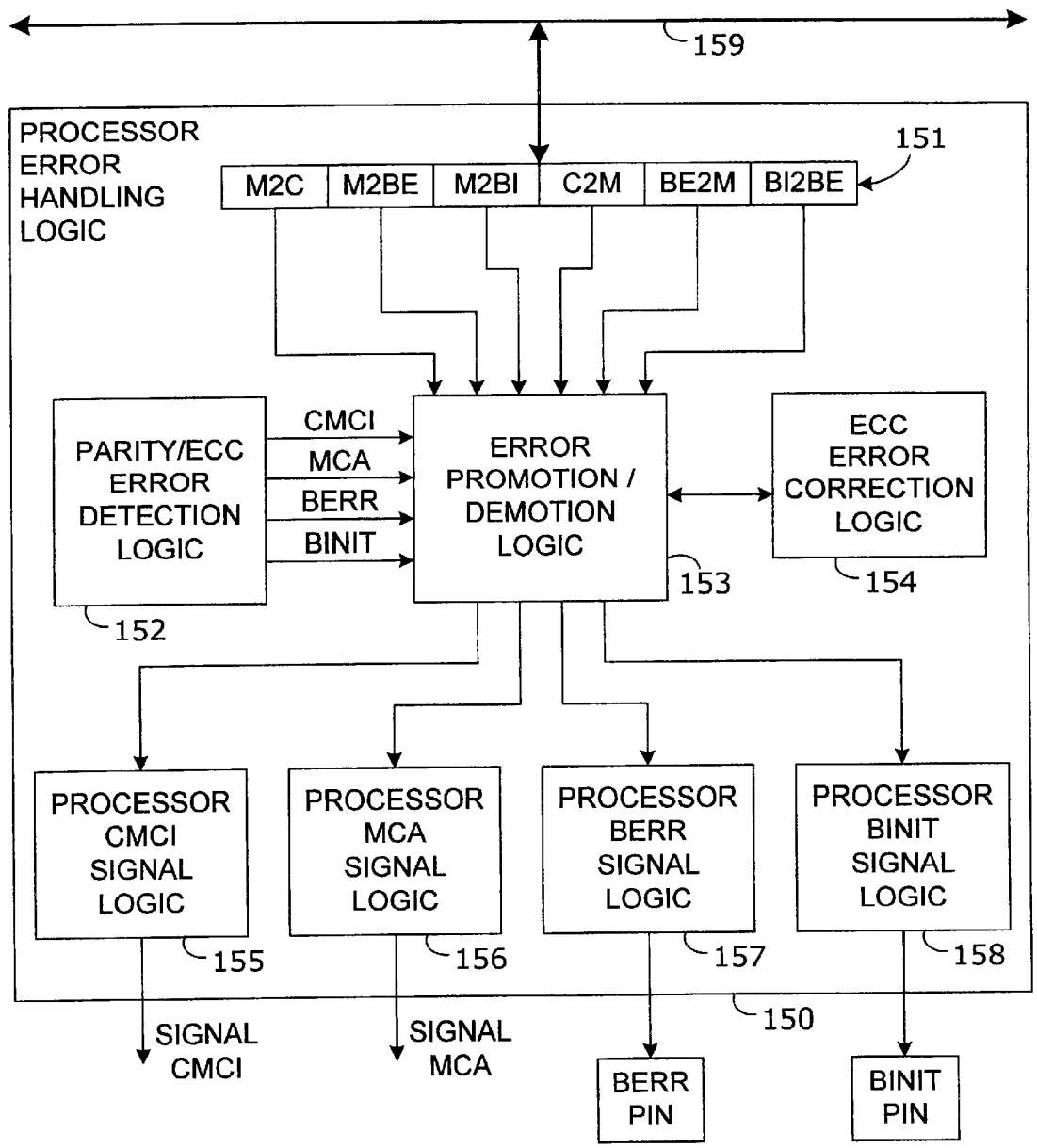
FIG. 2 is a block diagram illustrating the processor error handling logic of FIG. 1 in greater detail according to an embodiment of the present invention.

FIG. 2 is a high level block diagram representation of how the processor handles errors according to an embodiment of the present invention. Processor error handling logic 150 implemented in the processor receives inputs from a machine specific register 151. Values are loaded in register 151 via a processor private control register access bus 159 which is used for communication between the processor core 104 and the processor error handling logic 150. Functionally the following are implemented in the processor error handling logic 150: parity error checking and correcting (ECC) error detection logic 152, error promotion/demotion logic 153, ECC error correction logic 154, processor CMCI signaling and generation logic 155, processor MCA signaling and generation logic 156, processor BERR signaling and generation logic 157, processor BINIT signaling and generation logic 158.

Machine specific register 151 is controlled via the processor control register access bus 159. According to an embodiment of the present invention, machine specific register 151, includes programmable bits. The behavior resulting from setting these bits is as follows:

m2—CMCI to MCA promotion. In an enabled state, e.g., a '1' value, all hardware correctable errors are promoted to MCA. The processor hardware still corrects the error, but an MCA is taken.

m2be—MCA to BERR promotion. When enabled, the processor promotes all local MCA to global MCA. The external BERR pin is asserted. The firmware corrects this error.

be2bi—BERR to BINIT promotion. When enabled, the processor promotes all global MCA BERR errors to global MCA BINIT errors. The BINIT pin is asserted and the signaling as well as the receiving processor of this BINIT pin performs a BINIT reset.

m2c—MCA to CMCI demotion. When enabled, the processor demotes all MCA error conditions to CMCI. The processor does not take an MCA and only sends a CMCI condition.

be2m—BERR to MCA demotion. When enabled, the processor demotes all MCA BERR error conditions to MCA error conditions. The processor does not assert the BERR pin.

bi2be—BINIT to BERR demotion. When enabled, the processor demotes all global MCA BINIT error signaling to global MCA BERR error signaling. The processor does not perform a BINIT reset.

Processor error handling logic 150 receives instructions via processor private control register access bus 159 within the processor for programming signaling mechanism promotion/demotion as specified by a specific O/S or platform vendor. More specifically, the error promotion/demotion logic 153 receives control bits from the machine specific register 151 which is loaded via bus 159. Once an error is detected by parity/ECC error detection logic 157, the detected logic is assigned its associated signaling mechanism and sent to the error promotion/demotion logic 153 for processing.

Figure 3:
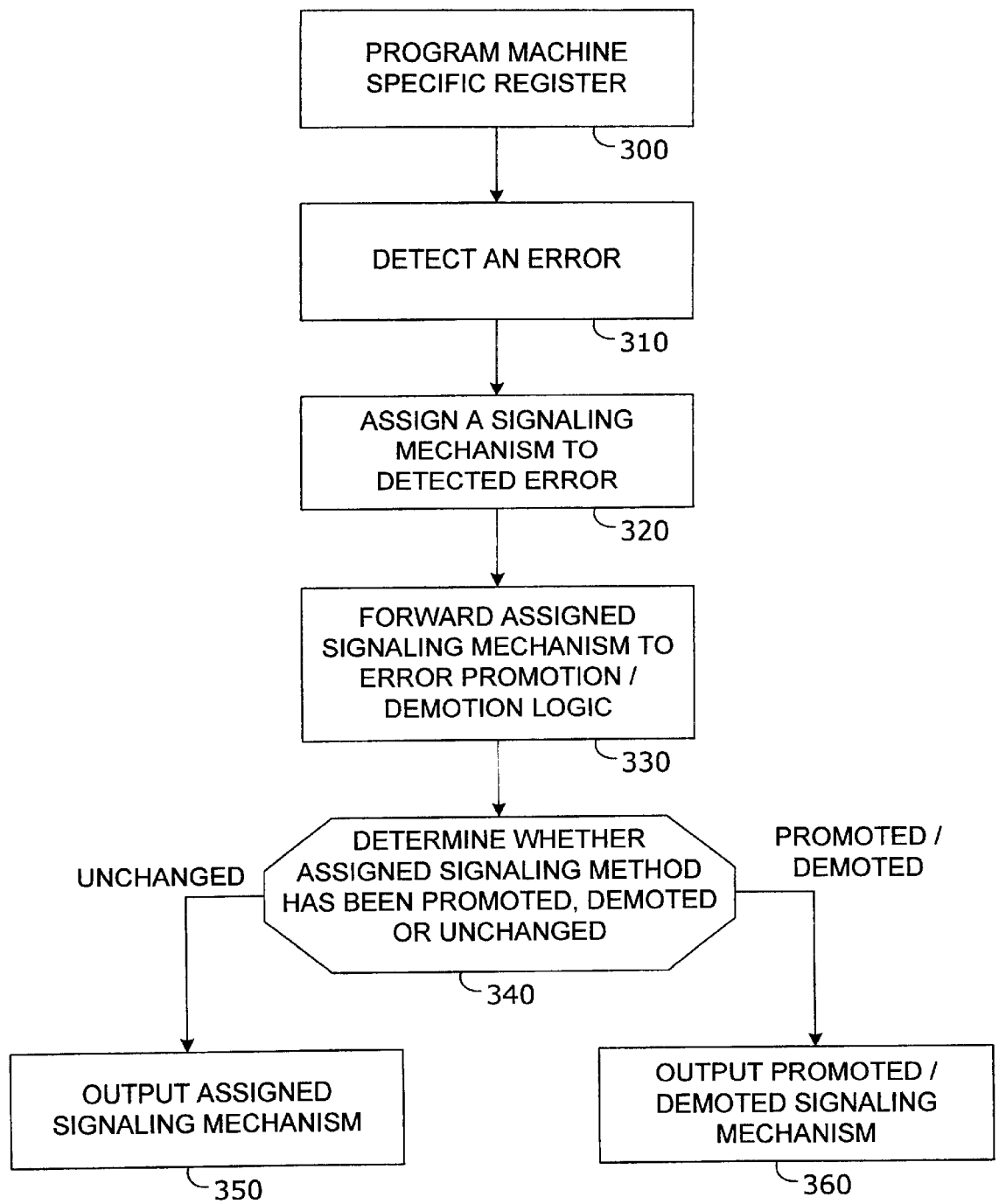
FIG. 3 is a flow diagram illustrating a method for promoting/demoting a signaling mechanism according to an embodiment of the present invention.

FIG. 3 is a flow diagram illustrating a method for promoting/demoting a signaling mechanism according to an embodiment of the present invention. The process begins with programming the machine specific register 150 (step 300). This programming may be defined by the platform-vendors, operating system vendor, etc. The machine specific register is programmed by setting the bits in the register as discussed above. The process continues with a detection of an error by the parity/ECC error detection logic 152 (step 310). The detected errors can be classified as one of the four error types discussed above. All type 1 errors are corrected by the ECC error correction logic 154.

Type 2 errors are corrected by the firmware. Type 3 and 4 errors cannot be corrected by the firmware.

The detected error is assigned as associated a signaling mechanism (step 320). The signal mechanisms include CMCI., MCA, BERR and BINIT as described above. The assigned signaling mechanism is sent to error promotion/demotion logic 153 (step 330). After error promotion/demotion logic 153 receives the assigned signaling mechanism, it reads the values programmed in machine specific register 151 to determine whether the signaling mechanism has been either promoted, demoted or unchanged (step 340). If the assigned signaling mechanism has not been changed, the unchanged signaling mechanism is sent to the processor's signaling and generation logic 155–158 to be output (step 350). If the signaling mechanism has been either promoted or demoted, the signaling mechanism is modified as described above and the promoted or demoted signaling mechanism is sent to on of the processor signaling and generation logic 155–158, to handle the detected error (step 360).

Below are a couple examples for promoting a demoting signaling mechanisms according to the present invention.

EXAMPLE 1

In a lock step application, i.e., two processors are configured to perform the same function simultaneously. An error corrected by the processor error handling logic will cause these processors to become out of synchronization with each other because one processor will send a CMCI and the other will not. In this application, the CMCI signaling mechanism (which is not visible on the processor's pin) can be promoted to the BERR signaling mechanism which is visible on the processor's pin.

EXAMPLE 2

The BERR pin is often used in many platforms to turn off traffic to prevent error propagation to permanent storage. For these platforms, it is sufficient for the processor to signal a BERR for the error type for error containment. Platforms that are not designated to take advantage of this feature can promote the BERR to BINIT conditions. Finally, during a system debugging phase, it may be desirable to demote a BINIT to a BERR so that additional information may be obtained since the processor does not perform a BINIT reset in this case.

In accordance with an embodiment of the present invention, processor error handling logic controls the way a processor generates a signaling mechanism for specific error types. The processor error handling logic includes a machine specific register registering a signaling mechanism promotion/demotion scheme for a plurality of detected errors, parity/error checking and correcting (ECC) logic providing at least one detected error; and error promotion/demotion logic receiving at least one detected error and communicating with the machine specific register to generate a promoted, demoted or unchanged signaling mechanism.

Several embodiments of the present invention are specifically illustrated and/or described herein. However, it will be appreciated that modifications and variations of the embodiments of the present invention are covered by the above teachings and within the purview of the appended claims without departing from the spirit and intended scope of the invention

What is claimed is:

1. A method of handling errors occurring in a processor, comprising:

promoting or demoting a signaling mechanism associated with an error based on a set of stored values, wherein said promoting or demoting a signaling mechanism includes promotion of a first signaling mechanism to a second signaling mechanism, and wherein said promotion includes the processor correcting errors but generating the second signaling mechanism.

2. A method of handling errors occurring in a processor, comprising:

promoting or demoting a signaling mechanism associated with an error based on a set of stored values, wherein said promoting or demoting a signaling mechanism includes promotion of a first signaling mechanism to a second signaling mechanism, and wherein said promotion includes asserting a first external pin.

3. The method according to claim 2, wherein said promoting or demoting a signaling mechanism includes demotion of a second mechanism to a first signaling mechanism.

4. The method of claim 3, wherein said demotion includes the processor generating a first signaling mechanism.

5. The method according to claim 3, wherein said promoting or demoting a signaling mechanism includes demotion of a third signaling mechanism to a second signaling mechanism.

6. The method of claim 5, wherein said demotion includes the first external pin not being asserted.

7. The method according to claim 5, wherein said promoting or demoting a signaling mechanism includes demotion of a fourth signaling mechanism to a third signaling mechanism.

8. The method of claim 7, wherein said demotion includes the system not being reset.

9. A method of handling errors occurring in a processor, comprising:

promoting or demoting a signaling mechanism associated with an error based on a set of stored values, wherein said promoting or demoting a signaling mechanism includes promotion of a first signaling mechanism to a second signaling mechanism, and wherein said promotion includes the processor asserting an external pin and performing a reset operation.

10. Error handling logic for a processor having a plurality of error types each of which is assigned to a signaling mechanism, comprising:

a register storing a promotion/demotion value for at least one error;

error detection logic; and error promotion/demotion logic receiving inputs from said register and said error detection logic and producing an output to one of said signaling mechanisms, wherein said register includes a value for enabling promotion of a first signaling mechanism to a second signaling mechanism, and wherein said promotion includes the processor correcting errors but generating the second signaling mechanism.

11. Error handling logic for a processor having a plurality of error types each of which is assigned to a signaling mechanism, comprising:

a register storing a promotion/demotion value for at least one error;

error detection logic; and error promotion/demotion logic receiving inputs from said register and said error detection logic and producing an output to one of said signaling mechanisms, wherein said register includes a value for enabling promotion of a first signaling mechanism to a second signaling mechanism, and wherein said promotion includes asserting an external pin.

12. The apparatus of claim 11, wherein said register includes a value for enabling demotion of a second signaling mechanism to a first signaling mechanism.

13. The apparatus of claim 12, wherein said demotion includes the processor generating the first signaling mechanism.

14. The apparatus of claim 12, wherein said register includes a value for enabling demotion of a third signaling mechanism to a second signaling mechanism.

15. The apparatus of claim 14, wherein said demotion includes the external pin not being asserted.

16. The apparatus of claim 14 wherein said register includes a value for enabling demotion of a fourth signaling mechanism to a third signaling mechanism.

17. The processor of claim 16, wherein said demotion includes the system not being reset.

18. Error handling logic for a processor having a plurality of error types each of which is assigned to a signaling mechanism, comprising:

a register storing a promotion/demotion value for at least one error;

error detection logic; and error promotion/demotion logic receiving inputs from said register and said error detection logic and producing an output to one of said signaling mechanisms, wherein said register includes a value for enabling promotion of a first signaling mechanism to a second signaling mechanism, and wherein said promotion includes the processor asserting an external pin and performing a reset operation.

19. A computer-readable memory having stored thereon a plurality of instructions for handling errors in a processor having a plurality of types or errors each of which is assigned to a signaling mechanism, causing a processor to:

promote or demote a signaling mechanism associated with an error based on a set of stored values, wherein said promoting or demoting a signaling mechanism includes promotion of a first signaling mechanism to a second signaling mechanism, and wherein said promotion includes asserting an external pin.

* * * * *